(12) United States Patent
Hamid

(10) Patent No.: US 7,274,804 B2
(45) Date of Patent: Sep. 25, 2007

(54) METHOD AND APPARATUS FOR HASHING DATA

(75) Inventor: Laurence Hamid, Ottawa (CA)

(73) Assignee: Activcard Ireland Limited, Dublin (IE)

(*) Notice: Subject to any disclaimer, the term of this patent is extended or adjusted under 35 U.S.C. 154(b) by 639 days.

(21) Appl. No.: 10/412,348

(22) Filed: Apr. 14, 2003

(65) Prior Publication Data
US 2003/0223624 A1 Dec. 4, 2003

Related U.S. Application Data

(63) Continuation-in-part of application No. 10/157,120, filed on May 30, 2002.

(51) Int. Cl.
G06K 9/00 (2006.01)
H04L 9/00 (2006.01)

(52) U.S. Cl. .................. 382/115; 340/5.52; 902/3; 713/186

(58) Field of Classification Search ........ 382/115–127; 340/5.1, 5.2, 5.52, 5.53; 902/3; 713/186; 356/71
See application file for complete search history.

(56) References Cited

U.S. PATENT DOCUMENTS

| 5,513,272 | A | 4/1996 | Bogosian, Jr. |
| 5,920,640 | A | 7/1999 | Salatino et al. |
| 6,016,476 | A | 1/2000 | Maes et al. |
| 6,035,398 | A * | 3/2000 | Bjorn .................. 713/186 |
| 6,185,316 | B1 * | 2/2001 | Buffam .................. 382/115 |
| 6,202,151 | B1 * | 3/2001 | Musgrave et al. ......... 713/186 |
| 6,219,439 | B1 | 4/2001 | Burger |
| 6,282,302 | B1 | 8/2001 | Hara |
| 6,507,912 | B1 * | 1/2003 | Matyas et al. ............ 713/186 |
| 2002/0095587 | A1 * | 7/2002 | Doyle et al. .............. 713/186 |
| 2003/0103653 | A1 * | 6/2003 | Avni et al. ................ 382/119 |
| 2003/0115475 | A1 * | 6/2003 | Russo et al. .............. 713/186 |
| 2004/0215615 | A1 * | 10/2004 | Larsson et al. ............ 707/9 |

FOREIGN PATENT DOCUMENTS

| EP | 0 680 004 A1 | 11/1995 |
| WO | WO 00/51244 A1 | 8/2000 |
| WO | WO 00/65478 A1 | 11/2000 |
| WO | WO 01/11577 A1 | 2/2001 |
| WO | WO 01/84494 A1 | 11/2001 |
| WO | WO 01/90962 A1 | 11/2001 |
| WO | WO 01/99042 A1 | 12/2001 |
| WO | WO 03/003286 A1 | 1/2003 |

OTHER PUBLICATIONS

Vielhauer et al., "Biometric Hash Based On Statistical Features of Online Signatures", Aug. 2002, IEEE, vol. 1, pp. 123-126.*
Davida et al., "On Enabling Secure Applications Through Off-line Biometric Identification", XP-00082537, pp. 148-156, IEEE 1998.

* cited by examiner

Primary Examiner—Bhavesh M Mehta
Assistant Examiner—Aaron W Carter
(74) Attorney, Agent, or Firm—Woodcock Washburn LLP

(57) ABSTRACT

A method of hashing biometric data for generation of a public template is disclosed. According to the method, a hash function is provided for hashing of feature data the hash function a function of data within the biometric information and determinable therefrom but resulting in a hashing result from which the original feature data is indiscernible.

54 Claims, 5 Drawing Sheets

METHOD AND APPARATUS FOR HASHING DATA

This application is a continuation-in-part of U.S. patent application Ser. No. 10/157,120 filed May 30, 2002.

FIELD OF THE INVENTION

The invention relates to a biometric identification processes and more particularly to a method of hashing biometric data to render same less indicative of an original biometric information content.

BACKGROUND OF THE INVENTION

Access systems are well known in the art of security. Most common access systems involve a step of comparing something from or of an individual with a reference value. For example, a well-known method of securing access involves providing a password to a data entry point. The password is then hashed and compared to a reference value. When the comparison indicates that the entered password was valid for access, then access is provided.

Hashing of the password before comparison with a reference value provides two benefits. Firstly, the value is obfuscated if it is to be provided via an unsecure path. Secondly, the reference value can be stored in a hashed fashion preventing access thereto from resulting in a security breach; anyone accessing the reference value only has access to the hashed value and not to the actual password.

In biometric registration, there is a considerable concern over access to biometric information. Since biometric information is treated as static—unchanging—information, it is important that the information is safeguarded from unauthorized access. Therefore, the above noted method is useful in biometric information characterization for preventing access to the biometric information itself.

Unfortunately, biometric information is not provided in a completely static fashion. Though a fingertip, for example, does not change substantially over the course of a day, each fingerprint captured is different. Sometimes, fingerprints are very different. Thus, hashing of a fingerprint is not as easily performed for supporting the same method as is known for use with passwords. In order to successfully support the same method, each fingerprint would essentially need to be captured identically—something that is impossible. Otherwise, each fingerprint must be processed to align it with the reference data in precise repeatable known fashion.

A common method of fingerprint alignment involves extracting an identifiable feature—commonly the core—and transforming the image such that the core is positioned and oriented in a predetermined manner. Then, all extracted and subsequently hashed feature data is comparable to the enrolled fingerprint data. Unfortunately, core alignment is not sufficiently accurate to support extremely reliable fingerprint recognition. An alternative solution for aligning fingerprint data is to provide the reference data in its raw form to the image capture system and then to overlay the images to ensure accurate alignment. Unfortunately, this is very limited since it provides the biometric information in an available fashion from the reference value storage medium Such methods are discussed in patent application WO 01/11577 and WO 01/84494, both assigned to Precise Biometrics. In these references, methods are disclosed wherein a processor external to the smart card pre-processes biometric information to extract therefrom a small subset of the biometric information—a portion of an image of a fingerprint—in order to reduce the amount of processing required on a smart card processor.

In patent application WO 01/11577, it is disclosed to transmit a subset of biometric information in the place of a personal identification number (PIN) that is commonly used to access information stored on a smart card. In reality, the subset of biometric information becomes the new PIN and is merely a larger PIN that is more difficult to guess. That said, once the PIN is guessed successfully, security of the smart card is compromised and the device and method are rendered useless. Also, the use of a subset of, for example, a fingerprint image as a PIN is difficult, since fingerprints and other biometric information sources are not truly repeatably sensable.

In patent application WO 01/84494, it is disclosed to transmit to a first host processor a portion of the stored biometric information sample for use in alignment and subset extraction. A pre-processed subset is provided to a smart card, and only a small portion of the original data sensed from the biometric information sample of the authorized user requires processing on the smart card. The reduced amount of data for processing by the smart card processor results in a reduced processing time and, as such, enhances performance. Unfortunately, the data provided from the smartcard in fingerprint data and it is typically undesirable to freely distribute fingerprint data as public data.

The above-described limitations of the prior clearly indicate the need for a method, which allows for preprocessing of fingerprint data before a comparison with an enrollment template is made, but according to which no sensible or characteristic data is surrendered. Preferably, the information transmitted from a smart card to a host processor, when intercepted, does not contain any direct information regarding the enrolled fingerprint template.

SUMMARY OF THE INVENTION

It is an advantage of the instant invention that a method is provided, according to which alignment data are transformed so that when intercepted, a third part cannot retrieve sensible information relating to secure data from the transformed alignment data.

According to the invention there is provided a method of biometric information processing comprising the steps of: providing biometric data relating to at least a biometric information sample; extracting from the biometric data feature data relating to each of a plurality of features; providing a hash function F, the hash function dependent upon a characteristic of at least one of the plurality of features, the characteristic determinable from the plurality of features but other than determinable from a result of the hash function in isolation; and, transforming at least two of the plurality of features according to the hash function F, resulting in hashed features.

According to another aspect of the invention there is provided a storage medium comprising a biometric template stored thereon and comprising: feature data relating to each of a first plurality of features from a same biometric information source; hash data relating to one of a hash function F, the hash function dependent upon a characteristic of at least one feature from a same biometric information source, the characteristic determinable from the same biometric information source but other than determinable from a result of the hash function in isolation and a result of the hash function F.

According to yet another aspect of the invention a method is provided for hashing biometric data comprising the steps of: providing a first storage medium having biometric template data stored thereon, the biometric template data relating to a set of features of a biometric image and including data relating to a hashed subset of alignment features, the hashed subset of alignment features hashed in accordance with reference data determinable from the biometric template data, the data relating to the hashed subset being insufficient for, in isolation, providing sufficient information to determine the reference data; providing a first processor in communication with the storage medium; providing a second storage medium having live biometric data stored thereon, the live biometric data relating to a biometric image of a live biometric feature; providing a second processor in communication with the second storage medium; transmitting from the first processor data relating to a hashed subset of alignment features to the second processor; determining with the second processor a hash function of a predetermined format from the hashed subset of alignment features; determining with the second processor data relating to the subset of alignment features from the data relating to the hashed subset of alignment features in dependence on the hash function; and aligning the live biometric features with the alignment features.

BRIEF DESCRIPTION OF THE DRAWINGS

The instant invention is now described in connection with the following drawings, in which.

DETAILED DESCRIPTION OF THE INVENTION

The instant invention relates to a method for generating public data that can be used for fingerprint matching. The public data is generated from a biometric enrollment template and is used to pre-process a live sample before a final match of the live sample is performed against the enrollment template. The instant invention is described with reference to biometrics, where a host processor uses the public data to achieve an alignment of a biometric sample in the form of a live fingerprint sample with a biometric template in the form of a fingerprint template before a final match is performed. The public data itself is generated according to the invention using a hash function of some of the information included within a biometric sample from which, for example, the biometric template is formed. Although exemplarily described for fingerprints, the instant invention applies to other biometric features as well, as does it apply to the general problem of pattern alignment and pattern comparison. Therefore, the instant invention is to be considered within the broadest scope consistent with the ideas disclosed herein and the claims that follow.

Figure 1:
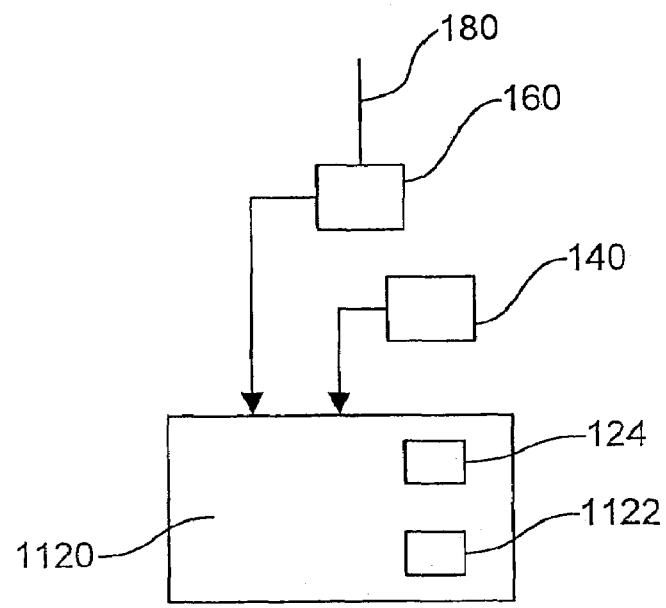
FIG. 1 depicts a schematic diagram of a prior art apparatus for use with the method according to the instant invention.

Referring now to FIG. 1, shown is a prior art fingerprint identification system for applying the method according to the instant invention. A host processor 1120 comprising a central processing unit 1122 and random access memory 124 is coupled to a biometric sensor 140 and a smart card reader 160. The smart card reader is for receiving a smart card 180, and establishing a connection between the host processor 1120 and the smart card. The biometric sensor 140 senses a fingerprint, and fingerprint data is transmitted to the host processor 1120. The host processor contains software for pre-processing fingerprint data according to data received from the smart card 180 inserted into the smart card reader, and for communicating the pre-processed fingerprint data to the smart card. Alternatively, the smart card reader 160 and the biometric sensor 140 are a same device.

Figure 2:
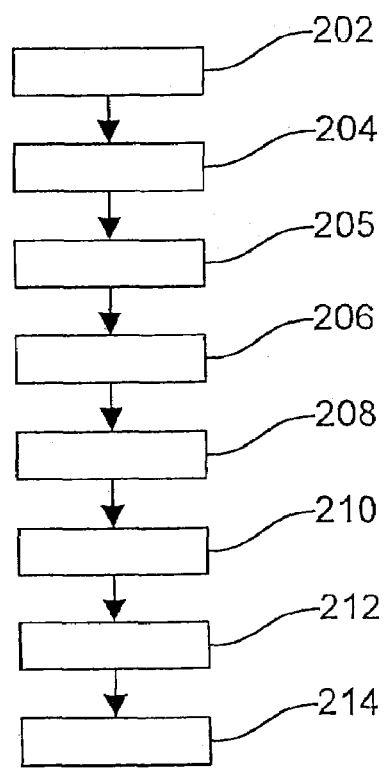
FIG. 2 shows a flow chart illustrating a prior art method of biometric data alignment.

With reference to FIG. 2, shown is a flow chart for a method of fingerprint identification with pre-processing of live fingerprint data according to the prior art. In step 202, a live biometric sample in the form of a fingerprint is sensed by the sensor 140 and is provided to the host processor 1122. The host processor 1122 is in communication with smart card 180 via smart card reader 160. The smart card 180 comprises biometric template data stored therein. Biometric template data in the form of type and location of minutiae within a selected area of the fingerprint—usually about the core of the fingerprint, are transmitted from the smart card 180 to the host processor 1122, step 204. The host processor 1122 pre-processes the live fingerprint sample by filtering the image to reduce effects of noise, step 205. Then, the live fingerprint sample is processed by the processor 1122 to determine a frame of reference common to the live fingerprint sample and the biometric template, step 206. The processor 1122 then extracts characteristic features from the live fingerprint sample, step 208, the extracted characteristic features within the known frame of reference. At step 210, the extracted features and the template features are compared, and it is determined whether or not the features of the live fingerprint sample match the features of the biometric template stored on the smart card, step 212. When a match is determined within predetermined limits, the individual providing the live fingerprint sample is authenticated at step 214.

According to the method illustrated in FIG. 2, the smart card 180 surrenders the biometric template stored on the smart card. When the feature information within the template are received by the host processor 1122, a third party with access to the host processor 1122 obtains sufficient information to reconstruct within statistical limits portions of an image of the fingerprint sample, for which data are stored on the smart card 180. This greatly increases risks associated with a breach in security. Should a third party gain access to secure data such as encryption keys within a smart card 180, the data within the smartcard are no longer secure.

Referring now to FIG. 2, shown is a prior art method of preprocessing a fingerprint image wherein biometric data is provided to the preprocessor from the smartcard 180 in the form of a public portion of a biometric template. For example, during a registration step (not shown), an authorized user of the smart card 180 provides a fingertip having a fingerprint to an imaging device that is in communication with the smart card. The imaging device senses the topological features of the fingerprint and stores an image of the fingerprint template in memory of the smart card. The memory includes a public access portion for storing a public portion of the fingerprint image in step 20 and a private access portion for storing a private portion of the fingerprint image in step 21.

When the authorized user of the smart card wishes to be identified or recognized, the same fingertip is provided to an imaging device in step 22 of a host system in communication with the smart card, the fingerprint is imaged and stored electronically in a memory of the host system. The user provides a PIN to the host system in step 23 and the PIN is provided from the host system to the smart card in step 24. In dependence upon the PIN being verified, the smart card provides the public portion of the fingerprint image to a processor of the host system in step 25. The host processor aligns the sensed fingerprint image with the public portion of the fingerprint image that was provided from the smart card in step 26. The host processor then extracts from the aligned image an image portion from which the private template is derived in step 27. The image portion is provided to the smart card in step 28, where the smart card processor compares the image portion with the private portion of the template to determine a likelihood of a match in step 29. If a match is likely, the user is identified or recognized in step 30. If a match is other than likely, then the authorization attempt is rejected and the user is denied access.

Figure 3:
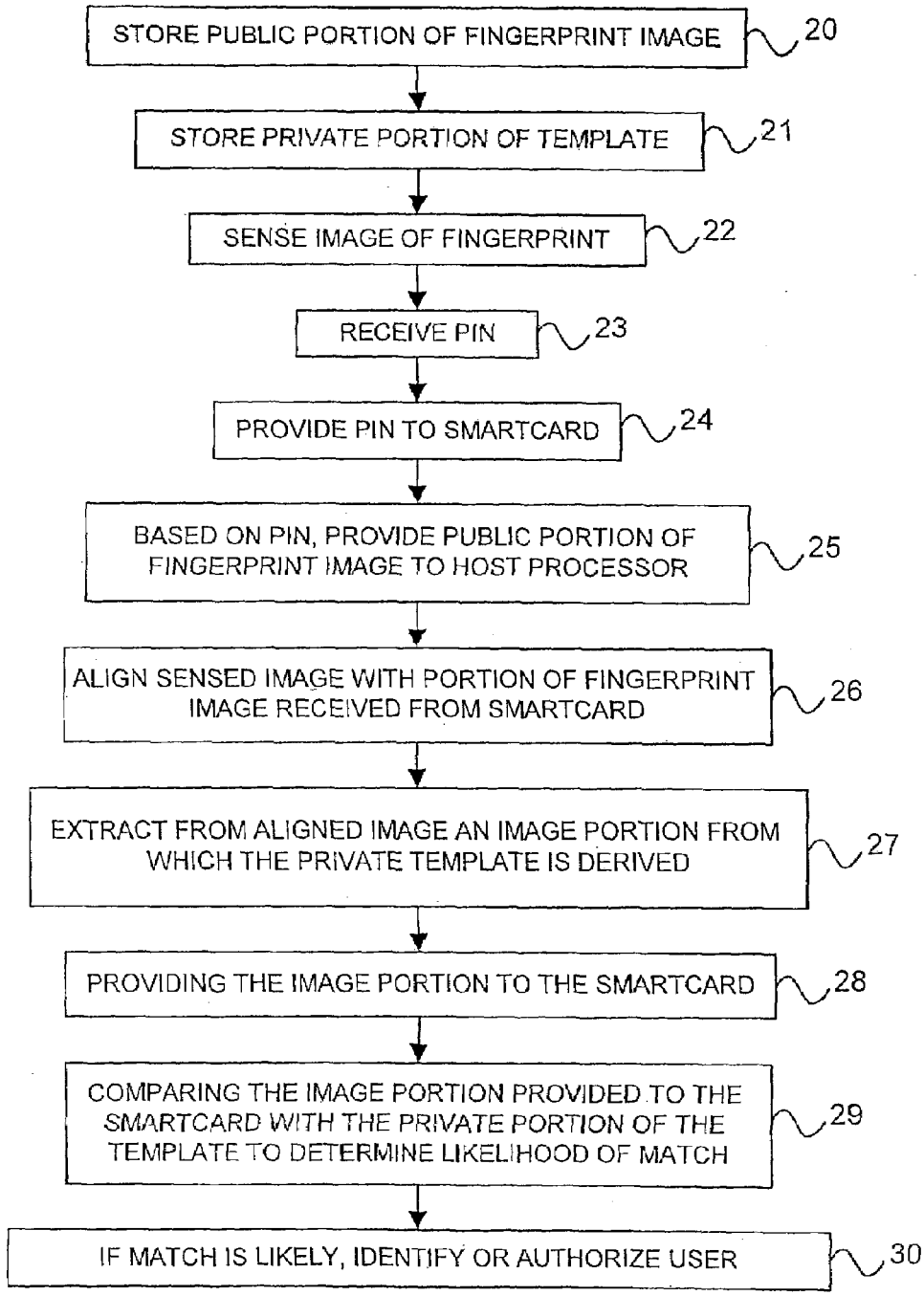
FIG. 3 is a simplified flow diagram of a prior art method of preprocessing a fingerprint image.

According to the method illustrated in FIG. 3, the smart card surrenders information corresponding to a portion of biometric sample. When this information, for example a portion of the biometric sample or a plurality of feature locations are received by the host processor 1122, a third party with access to the host processor 1122 obtains sufficient information to reconstruct within statistical limits portions of an image of the fingerprint, for which data are stored on the smart card. This greatly increases risks associated with a breach in security. Should a third party gain access to secure data such as encryption keys within a smart card, the data within the smartcard are no longer secure.

Performing a biometric comparison on a smart card rather than using a PIN is desirable since it provides a stronger binding of the card to the user. Due to the computation and memory constraints of smart cards, however, the amount of processing operations on the biometric data that are possibly and conveniently performed on a smart card is limited. Therefore, match-on-card (MOC) systems typically rely on other processors, such as host processors, to do some pre-processing of the data relevant for a final match. Public data delivered by a smart card to a host processor allows the host processor to perform operations beyond template creation from a live sample, including for example alignment or selection of features to be sent to the smart card for final matching.

A problem associated with today's MOC systems is that public data is either part of an enrollment template, or it provides information about features stored within the enrollment template. In either case, the amount of template information that can be used for matching is reduced, since it is possibly derived from the public data or determinable therefrom and is therefore not sufficiently secure for matching purposes. When considering the structure of public data, it is evident that public data is either part of the enrollment template, or it is not part of the enrollment template. Methods relating to public data being part of the enrollment template are well known in the prior art. In particular, the above-cited patent applications assigned to Precise Biometrics disclose methods in which the public data is part of the enrollment template. The instant invention relates to a method of generating public data that is not part of an enrollment template, and that is yet secure since it does not surrender valuable fingerprint data.

A general approach to this problem includes applying a hash function F to template data. Scope and type of suitable hash functions F however is limited, due to the absence of an absolute coordinate system. Features of an enrollment fingerprint template as well as of a live fingerprint template exist within their own local reference frames. A hash function F applied to a set of data in one reference frame will produce entirely different results when applied to the same set of data in another reference frame. In many cases a hash function F is unusable for fingerprint matching even when the reference frames of the live fingerprint template and enrollment fingerprint template differ only slightly.

Figure 4:
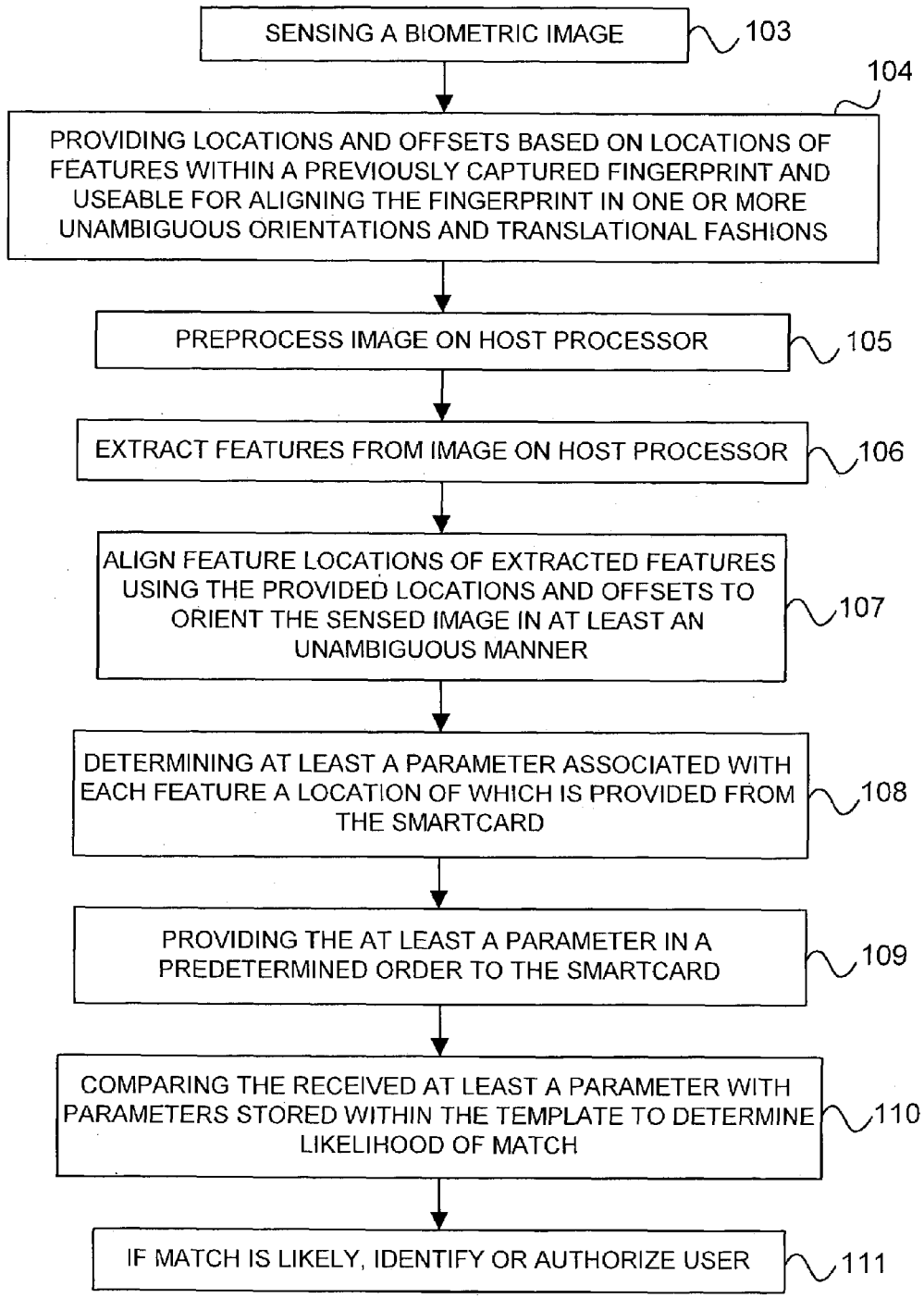
FIG. 4 is a simplified flow diagram of a method of preprocessing a fingerprint image according to another embodiment of the instant invention.

Referring now to FIG. 4, a method of preprocessing a fingerprint image according to the instant invention is shown, absent a step of providing data from the biometric sample or from the biometric template to a processor of a host system, from the smart card.

A fingerprint image of the user is captured using an imaging device of the host system in step 103. Locations and offsets based on locations of features within a previously captured fingerprint and useable for aligning the fingerprint in one or more unambiguous orientations and translational fashions are provided in step 104. The image is filtered and the contrast is adjusted to a normalized level in step 105. The fingerprint image is then analyzed by the host processor to determine features thereof in step 106. Typically features of fingerprints include ridge flow angle, minutia locations, minutia types, minutia directions, core location, core orientation, and so forth. Of course, in order for any of the features to have meaning, they all must be related to a global position and orientation; this global position and orientation is often related to the core location and orientation.

Next, the host processor receives from the smartcard a plurality of hashed data in the form of offset locations relative to feature locations associated with the template to which the fingerprint data is to be registered. Thus, the offset locations may be 4 pixels away from each feature location. The plurality of locations is a known offset from identifiable features, preferably features having accurately identifiable locations. Of course, the hash function preferably results in a repeatable offset though it could also be dynamic in nature requiring synchronization between the smartcard and the host or provided from the smartcard to the host in step 107. The host processor uses the extracted feature locations and directions to orient the captured fingerprint image relative to the provided locations. This is performed by identifying features within the image, determining feature locations and orientations, and then determining an image orientation such that the locations within the fingerprint sample the determined offset from the features in accordance with the hashing function overlap the locations provided in step 108.

Of course, other data extractable from the features is also useful in determining the direction. Alternatively, the direction is known but the feature angle or type is used to determine an offset to the provided location.

Once the image positioning is achieved, data relating to a plurality of features within the image are provided in a predetermined order to the smart card for correlation in step 109. For example, the data relates to minutia directions and types of features offset from the locations provided.

Thus the processor of the smart card need only compare a plurality of values to values within a template stored thereon in order to form a registration measure for use in user authorization in step 110. Preferably, the comparison is not a rigid comparison to allow for missed minutia or extra minutia within a template. If a match is likely, the user is identified or authorised in step 111. If a match is other than likely, then the authorization attempt is rejected and the user is denied access.

In accordance with yet another embodiment of the invention there is provided a method wherein locations relating to feature locations but not providing substnatial information relating to the biometric image is proposed. Unfortunately, for the above hashing technique with a radius and angle, if two different radii were used with a same individual, the two resulting circles, when plotted, have two intersections, which limits feature locations to two locations. As such, instead of a feature lying on a circle, it is now within one of two points. A third radius would likely result in knowledge of the feature location.

Figure 5:
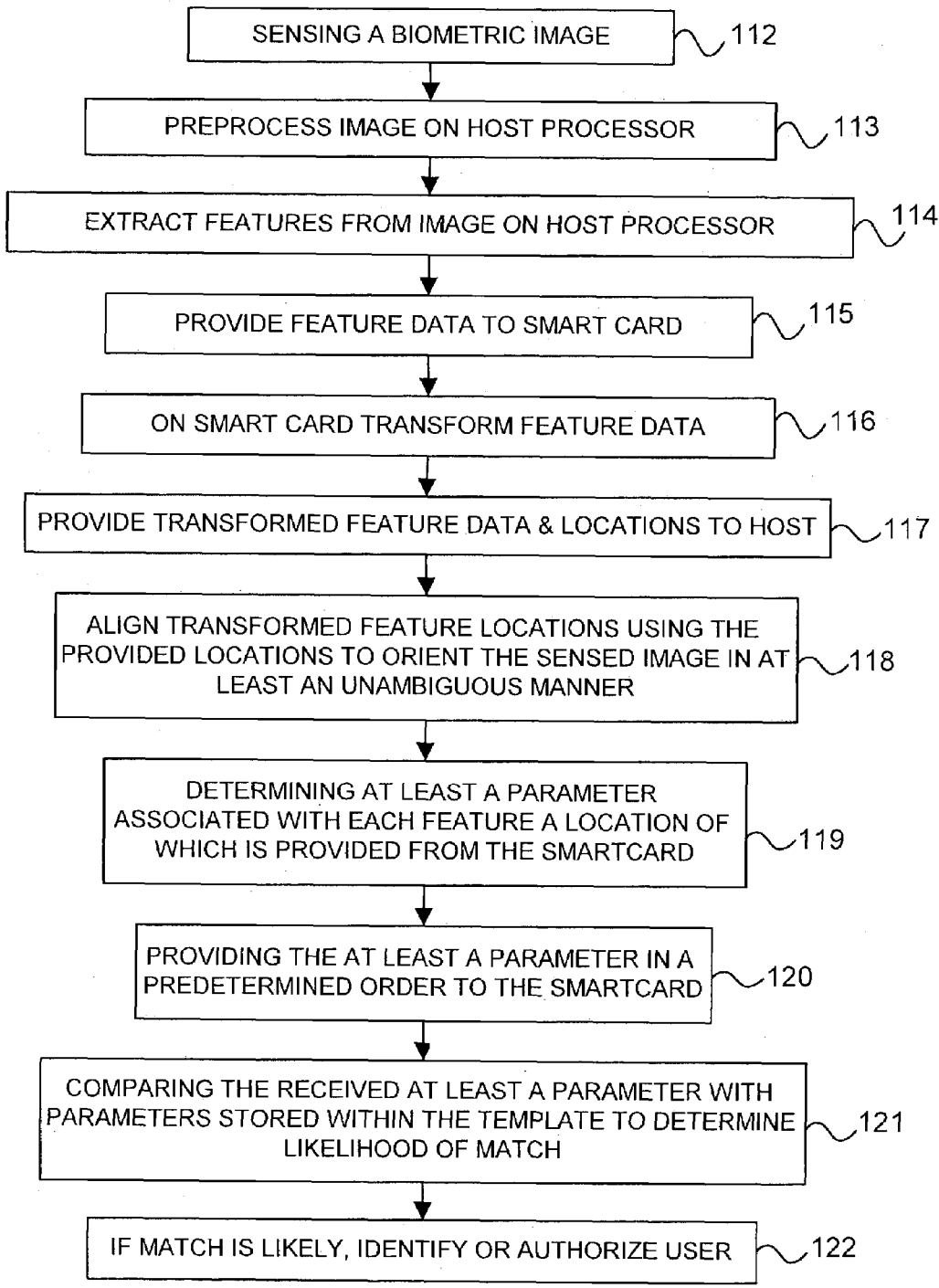
FIG. 5 is a simplified flow diagram of a method of preprocessing a fingerprint image according to another embodiment of the instant invention; and, FIG. 6 is a simplified flow diagram illustrating a method according to the instant invention for hashing biometric data.

Referring now to FIG. 5, a method of preprocessing a fingerprint image according to the instant invention is shown, absent a step of providing biometric data to a processor of a host system, from the smart card.

A fingerprint sample is formed by capturing a fingerprint image of the user using an imaging device of the host system in step 112. The image is filtered and the contrast is adjusted to a normalized level in step 113. The fingerprint image is then analyzed by the host processor to determine features thereof in step 114. Typically, features of fingerprints include ridge flow angle, minutia locations, minutia types, minutia directions, core location, core orientation, and so forth. Of course, in order for any of the features to have meaning, they all must be related to a global position; this global position and orientation is often related to the core location and orientation.

Next, the host processor provides to the smartcard data relating to the extracted features in step 115. For example, feature location and directions are provided. The smartcard applies a transform to each feature location in step 1116. Since the direction of each feature is provided, the smartcard can use this information in applying the transform. As such, application of radius and angle offsets to each feature location is possible with a reasonable amount of computation. The transformed feature locations are returned to the host processor in step 117 along with a plurality of alignment locations in step 118. Of course, changing radii or angle or feature quality on which these are based is now possible without divulging information on the feature locations of features within the template in step 119. Further, the alignment problem for the host processor is a straightforward alignment process since the feature locations and the alignment locations are known at the outset and need not be redetermined for different potential alignments as is the case for the method of FIG. 5.

Thus, the transformed feature locations may be 4 pixels away from each feature location and the alignment locations are similarly 4 pixels from each feature location. Once the image positioning is achieved, data relating to a plurality of features within the image are provided in a predetermined order to the smart card for correlation in step 120. For example, the data relates to minutia directions and types of features offset from the locations provided.

Thus the processor of the smart card need only perform a simple transform for each feature location received and compare a plurality of values to values within a template stored thereon in order to form a registration measure for use in user authorization in step 121. Preferably, the comparison is not a fixed comparison to allow for missed minutia or extra minutia within a template. If a match is likely, the user is identified or recognized in step 122. If a match is other than likely, then the authorization attempt is rejected and the user is denied access.

Advantageously, such a method permits different offsets and/or directions to be applied to different features based on the features themselves in performing image alignment. This obfuscates any feature related data that may be determined from the data provided. This also makes alignment of the image data very difficult absent knowledge of the process and the image contents.

The instant invention is preferably used in connection with biometric identification systems. In an embodiment, a matching operation is performed on a smart card that contains an enrollment template of a fingerprint. However, the instant invention is not restricted to use with smart cards, but equally applies to server based biometric systems. In general, the method is practiced on systems including comparison processors, like the ones within a smart card, as well as other processors such as host processors, the other processors using the public data to process a live fingerprint sample.

According to the method of the instant invention, a reference frame is determined implicitly by the entity processing or pre-processing a live biometric sample. The reference frame is either global in nature for the biometric sample or is local to features within the biometric sample. In an embodiment, as described above, parameters of a hash function are dependent on feature characteristics such as direction, type, etc. In a further embodiment, the hash function or its parameters are dependent on a selected feature. Therefore, a hash function F is effectively used for secure fingerprint matching. Since it is possible to implicitly determine reference frames using the biometric sample, the method according to the instant invention allows also complicated hash functions to be used, thereby decreasing the possibility for determining the biometric template contents, from the public.

In the following, various examples of hash functions F generated from a biometric template, referred to as reference template, are now described. Let Ref be the set of reference template features, the set containing minutia Mi. Further, the pair (Xi, Yi) refers to a location of minutia i, (Ai) refers to a direction of minutia I, and (Ti) refers to a type of minutia i. If F is a hash function then public data PD are expressed as hash function of the set of reference features: PD=F{Ref}.

A typical hash function F1 that is known in the prior art takes as its arguments minutia Mi as well as two random numbers s and t. F1 then generates a random offset of the minutia location:

$$F1(Mi,s,t)=(Xi+s\cdot\cos(Ai+t), Yi+s\cdot\sin(Ai+t)) \quad (1)$$

A key to implementation of the hash function F1 is a missing frame of reference, leading to the problems as discussed above. A solution to this problem is the use of a particular minutia Mk as internal reference frame for hash functions. Typically one Mk is selected to calculate the hash function F from the enrollment fingerprint template. However, to calculate the proper hash function F for the live fingerprint template, a plurality of possible Mk values for a live fingerprint template is applied, and a best alignment is determined. As this is performed by the host processor, the additional processing is not significant. The best alignment is typically determined by comparing a set of n provided minutia data Mn, which are provided as transformed data $M_n'$ where $M_n'=F(M_n)$, with a set of transformed corresponding calculated minutia data $M_{calc})_n'$ for the live fingerprint template. Typically, a best alignment is determined by minimizing goodness functions G, such as $$G = \sum_{j}^{n} |(M_{calc})'_j - M'_j| \quad \text{or} \quad G = \sum_{j}^{n} ((M_{calc})'_j - M'_j)^2.$$

Here, Mi is to be interpreted as minutia vector Mi=(Xi, Yi, Ai). The minutia vector typically has three components, but alternatively has fewer or more than three components. The minutia corresponding to $(M_{calc})_k'$ resulting in a best alignment is used for the hash function F when applied to the live fingerprint template features.

Various hash functions F with internal reference are possible. It is advantageous to incorporate into the hash function F the difference r between the ith minutia Mi and a particular reference minutia Mr, r=|Mi−Mr|. Two representative hash functions F2 and F3 are defined as follows:

$$F_2(M_i, M_r) = (X_i + r \cdot \cos(A_i), Y_i + r \cdot \sin(A_i)) \quad (2)$$

$$F_3(M_i, M_r) = (X_i + r \cdot \cos(A_i - A_r), Y_i + r \cdot \sin(A_i - A_r)) \quad (3)$$

F2 is derived from the known function F1 by replacing the random number s by the difference r and setting the random number t equal to zero, whereas F3 is derived from the known function F1 by replacing the random number s by the difference r and setting the random number t equal to the direction of the reference minutia Ar. Clearly, both functions F2 and F3 implicitly provide a relation to the reference minutia Mr.

Instead of using the trigonometric functions sine and cosine as constructs for a hash function F, one is free to choose any arbitrary function R as hash modifier. Particularly, functions that take differences involving the reference minutia are suitable for use in the method of the instant invention. In the following, RX is an arbitrary function of the difference Xi−Xk, RY is an arbitrary function of the difference Yi−Yk, and RA is an arbitrary function of the difference Ai−Ak. Given these definitions, hash functions F4 and F5 are defined as follows:

$$F4(Mi, Mr) = (Xi + RX, Yi + RY) \quad (4)$$

$$F4(Mi, Mr) = (Xi + RX, Yi + RY, Ai + RA) \quad (5)$$

According to hash function F4, minutia locations are presented to the host processor in an obfuscated fashion, whereas according to hash function F5, minutiae locations as well as minutiae directions are presented to the host processor in an obfuscated fashion.

In another example of a hash function, a frame of reference is not provided by a minutia Mr, but rather by a general reference feature, such as a base direction D. Let s be a random number, replacement with the random number t in F1 by D results in hash function F6:

$$F6(Mi, s, D) = (Xi + s \cdot \cos(Ai + D), Yi + s \cdot \sin(Ai + D)) \quad (6)$$

The host processor evaluates a goodness function G for a plurality of D values. For example the trial D values are chosen between 0° and 360° being spaced apart by increments of 1°. The D value resulting in the smallest value for G is the chosen for the final alignment. It is emphasized that D is not known a priori to the host computer, but is determined according to a well-defined computational procedure.

It is apparent to one of skill in the art that simpler or more complex hashing methods as well as varied hashing methods are supported according to the invention. Of course, since hashing for alignment purposes is typically only performed by the host processor, which is typically quite powerful, complexity of the hashing method is of lesser concern than obfuscation provided thereby. Further, complex determinations requiring many hashing attempts and alignment attempts are possible so long as the amount of processing time by the host processor is kept below an expected wait time of a user. For example, ½ second appears to be acceptable to most user providing adequate time to perform many complex operations on a 2.4 GHz Pentium® processor. For example, each feature may be hashed by a function of its characteristic and a characteristic of a nearby feature or features. Thus, a search space results to find accurate alignment depending on which nearby features are used in the function. Of course, one of skill in the art will appreciate that erroneous features—either present or absent—may affect suitability of some hashing functions for the purposes of the present invention.

The method according to the instant invention provides a substantial safety feature so that when data delivered by a smart card relate to data within a biometric template, the data does not provide inferential value to a third party intercepting the data other than for the purpose the data is provided for.

Figure 6:
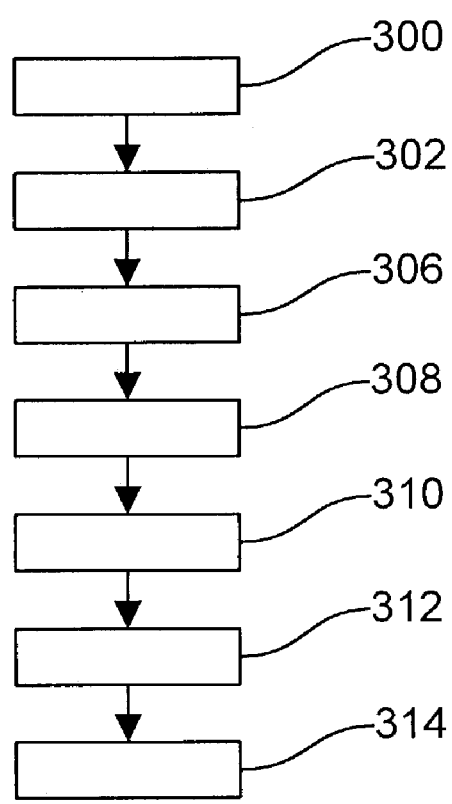

Referring to FIG. 6, a simplified flow diagram of an embodiment of the invention is shown. A smart card having a biometric template stored therein in the form of a fingerprint template is provided to a host processing system, step 300. Typically, the fingerprint template is stored as a collection of data referring to location, orientation, and type of characteristic features thereof. Typically, data for twenty or more characteristic features are stored within the template. A set of characteristic features for alignment are selected, step 302. With reference to Table 1, the data corresponding to the selected alignment features are depicted. The set of selected alignment features is typically a subset of all characteristic features stored on the smart card.

TABLE 1

| # | FEATURE | X-LOC | Y-LOC | ORIENTATION | TYPE |
|---|---------|-------|-------|-------------|------|
| 1 | Minutia | 0 | 0 | 0 | 0 |
| 2 | Minutia | 4 | 4 | 30 | 2 |
| 3 | Minutia | −4 | −1 | 300 | 1 |
| 4 | Minutia | 1 | −4 | 270 | 1 |

For each feature, information is stored for a set of two ordinates, an orientation, as well as a feature type. The feature type information is preferably coded, a "0" indicating a bend, a "1" indicating an end, a "2" indicating a bifurcation, and so forth.

In step 304, an internal reference is selected. Depending on a hash function, the internal reference is either a minutia Mr (hash functions F2, F3, F4, F5), feature dependent, or a general reference such as a base direction D (hash function F6). Data for the set of selected alignment features is transformed according to a hash function using reference data. For example, one of the hash functions F2, F3, F4, F5 or F6 is used. The transformed data are then transmitted to a host processor, step 306. Information about a type of hash function is either stored in memory of the host processor or is transmitted from the smart card to the host processor. The host processor hashes a biometric sample to reconstruct a best hash function based on the set of transformed data received from the smart card, step 308. For example, in case of using a hash function F6, the host processor hashes the live fingerprint sample accordingly to determine an alignment between the two sets of hashed data. This provides a known frame of reference, step 310. Then, the data for the features of the live fingerprint sample within the known frame of reference are transferred to the smart card, step 312. On the smart card, the received data are compared to the template data, step 314, and it is determined whether the two sets of data are sufficiently matched.

Advantageously, given a known hash function and a live fingerprint template, it is possible to perform the hash function to result in hashed public data. As such, the above described hash functions allow for transmission of public data for use in alignment, the public data other than actual feature coordinates but feature coordinates are determinable therefrom in the presence of a matching fingerprint sample. Thus, absent the correct fingerprint, little useful information is available from the co-ordinate data. That said, with the correct fingerprint data, the information is sufficient for the task for which it is provided.

It is clear to one of skill in the art that, based on the above disclosure, the method is applicable to retinal scans, palmprints, pore based biometric authentication techniques, and any other image and feature based correlation methods.

In the above example, the method according to the instant invention is described with reference to a MOC system using a smart card. It is understood that a smart card comprises memory for storing data, an interface for communicating and exchanging data with other devices, as well as a processor for manipulating stored data. The method according to the instant invention is not restricted to MOC systems. For example, public data are possibly-used in server-based authentication systems where one or more host processors—workstations—perform processing of the biometric sample with the public data prior to transmitting the processed data to a server.

Numerous other embodiments may be envisaged within the spirit and scope of the present invention, as defined in the appended claims

What is claimed is:

1. A method of biometric information processing comprising the steps of:
   extracting from biometric data relating to at least a biometric information sample, feature data relating to each of a plurality of features; and
   transforming at least two of the plurality of features according to a hash function F, in order to create hashed features, wherein the hash function F is dependent upon a characteristic of at least one of the plurality of features, the characteristic determinable from the plurality of features but indeterminable from a result of the hash function.

2. The method according to claim 1, comprising the steps of:
   storing data relating to the plurality of features within a storage medium; and,
   storing data relating to the hashed features within the storage medium.

3. The method according to claim 2, wherein the storage medium comprises a smartcard.

4. The method according to claim 2, wherein the storage medium comprises a secure authentication server.

5. The method according to claim 1, wherein the biometric information sample comprises a fingerprint.

6. The method according to claim 1, comprising the steps of:
   storing the hashed features as public template data; and,
   storing data relating to the feature data as private template data in a secure storage medium, wherein the public data is for provision to an external processor for use in aligning a live biometric sample with the private template data.

7. The method according to claim 1, wherein the hash function is a function of a selected internal reference feature, the internal reference feature included in the plurality of biometric features.

8. The method according to claim 1, wherein the hash function is a function dependent upon a characteristic of each feature other than a location thereof.

9. The method according to claim 1, wherein the plurality of features include fingerprint minutia.

10. The method according to claim 9, wherein the hash function is a function of a location of the fingerprint minutia and at least one of an orientation and a type of the fingerprint minutia.

11. The method according to claim 1, wherein the hash function F is of the form:

$$F(Mi,r,t)=(Xi+r*\cos(Ai+t), Yi+r*\sin(Ai+t))$$

Where
r and t are random parameters;
Mi represent Minutia i;
(Xi, Yi) be the location of Minutia i; and
(Ai) be the direction of Minutia i.

12. The method according to claim 1, wherein the hash function F is of the form:

$$F(Mk,Mi)=(Xi+ri*\cos(Ai\ Yi+ri*\sin(Ai))$$

Where ri ôjMk–Mu;
Mi represent Minutia i;
(Xi, Yi) be the location of Minutia i; and
(Ai) be the direction of Minutia i.

13. The method according to claim 1, wherein the hash function F is of the form:

$$F(Mk,Mi)=(Xi+ri*\cos(Ai-Ak), Yi+ri*\sin(Ai-Ak))$$

Where ri=JMk–Mij;
Mi represent Minutia i;
(Xi, Yi) be the location of Minutia i; and
(Ai) be the direction of Minutia i.

14. The method according to claim 1, wherein the hash function F is of the form:

$$F(Mk, Mi)=(Xi+Rx, Yi+Ry)$$

Where Rx is an, arbitrary function of Xi–Xk;
Ry is an arbitrary function of Yi–Yk;
Mi represent Minutia i; and,
(Xi, Yi) be the location of Minutia i.

15. The method according to claim 1, wherein the hash function F is of the form:

$$F(Mk, Mi)=(Xi+Rx, Yi+Ry, Ai+A)$$

Rx is an arbitrary function of Xi–Xk;
Ry is an arbitrary function of Yi–Yk;
A is an arbitrary function of Ai–Ak;
Mi represent Minutia i;
(Xi, Yi) be the location of Minutia i; and
(Ai) be the direction of Minutia i.

16. The method according to claim 1, wherein the hash function F is of the form:

$$F(Mi,r,D)=(Xi+r*\cos(Ai+D), Yi+r*\sin(Ai+D))$$

Where r and t are random parameters;
D is determined;
Mi represent Minutia i;
(Xi, Yi) be the location of Minutia i; and
(Ai) be the direction of Minutia i.

17. A method of biometric information processing comprising:
    storing feature data relating to each of a first plurality of features from a same biometric information source; and
    storing hash data relating to one of a hash function F, the hash function dependent upon a characteristic of at least one feature from a same biometric information source, the characteristic determinable from the same biometric information source but other than determinable from a result of the hash function and a result of the hash function F,
    wherein the hash data includes data relating to a plurality of instructions, the instructions when executed resulting in performance of the step of:
    hashing at least some of the feature data according to the hash function F.

18. The method according to claim 17, wherein the hash data includes a result of the hash function F.

19. The method according to claim 17, wherein the feature data includes data relating to fingerprint minutia.

20. The method according to claim 19, wherein the hash function is based on a location of the fingerprint minutia and at least one of an orientation and a type of the fingerprint minutia.

21. The method according to claim 17, wherein the hash function F is of the form:

$$F(Mi,r,t)=(Xi+r^*\cos(Ai+t),\ Yi+R^*\sin(Ai+t))$$

Where
r and t are random parameters;
Mi represent Minutia i;
(Xi, Yi) be the location of Minutia i; and
(Ai) be the direction of Minutia i.

22. The method according to claim 17, wherein the hash function F is of the form:

$$F(Mk,Mi)=(Xi+ri^*\cos(Ai),\ Yi+ri^*\sin(Ai\})$$

Where ri=jMk−Mil;
Mi represent Minutia i;
(Xi, Yi) be the location of Minutia i; and
(Ai) be the direction of Minutia i.

23. The method according to claim 17, wherein the hash function F is of the form:

$$F(Mk,Mi)=(Xi+ri^*\cos(Ai-Ak),\ Yi+ri^*\sin(Ai-Ak))$$

Where ri=IMk−Mij;
Mi represent Minutia i;
(Xi, Yi) be the location of Minutia i; and
(Ai) be the direction of Minutia i.

24. The method according to claim 17, wherein the hash function F is of the form:

$$F(Mk,\ Mi)=(Xi+Rx,\ Yi+Ry)$$

Where Rx is an arbitrary function of Xi−Xk;
Ry is an arbitrary function of Yi−Yk;
Mi represent Minutia i; and,
(Xi, Yi) be the location of Minutia i.

25. The method according to claim 17, wherein the hash function F is of the form:

$$F(Mk,\ Mi)=(Xi+Rx,\ Yi+Ry,\ Ai+A)$$

Rx is an arbitrary function of Xi−Xk;
Ry is an arbitrary function of Yi−Yk;
A is an arbitrary function of Ai−Ak;
Mi represent Minutia i;
(Xi, Yi) be the location of Minutia i; and
(Ai) be the direction of Minutia i.

26. The method according to claim 17, wherein the hash function F is of the form:

$$F(Mi,r,D)=(Xi+r^*\cos(Ai+D),\ Yi+r^*\sin(Ai+D))$$

Where r and t are random parameters;
D is determined;
Mi represent Minutia i;
(Xi, Yi) be the location of Minutia i; and
(Ai) be the direction of Minutia i.

27. A method for hashing biometric data comprising the steps of:
    providing a first storage medium having biometric template data stored thereon, the biometric template data relating to a set of features of a biometric image and including data relating to a hashed subset of alignment features, the hashed subset of alignment features hashed in accordance with reference data determinable from the biometric template data, the data relating to the hashed subset being insufficient for, in isolation, providing sufficient information to determine the reference data;
    providing a first processor in communication with the storage medium;
    providing a second storage medium having live biometric data stored thereon, the live biometric data relating to a biometric image of a live biometric feature;
    providing a second processor in communication with the second storage medium;
    transmitting from the first processor data relating to a hashed subset of alignment features;
    determining with the second processor a hash function of a predetermined format from the hashed subset of alignment features;
    determining with the second processor data relating to the subset of alignment features from the data relating to the hashed subset of alignment features in dependence on the hash function; and
    aligning the live biometric features with the alignment features.

28. The method according to claim 27, wherein the first storage medium and the first processor are disposed on a smart card.

29. The method according to claim 27, wherein the biometric image is a fingerprint image.

30. The method according to claim 27, wherein the live biometric data are provided by a biometric sensor in communication with the second processor.

31. The method according to claim 28, further comprising the steps of:
    transmitting data relating to the aligned biometric feature from the second processor to the first processor; and
    comparing the data relating to the aligned biometric feature with the biometric template data.

32. A computer readable medium containing a computer program thereon that when executed by a processor results in execution of the steps of:
    extracting from biometric data relating to at least a biometric information sample, feature data relating to each of a plurality of features; and
    transforming at least two of the plurality of features according to a hash function F, in order to create hashed features, wherein the hash function F is dependent upon a characteristic of at least one of the plurality of features, the characteristic determinable from the plurality of features but indeterminable from a result of the hash function.

33. A device for biometric information processing comprising:
a biometric sensor that senses at least a biometric sample; and
a processor that extracts from the biometric sample feature data relating to each of a plurality of features and transforms at least two of the plurality of features according to a hash function F in order to create hashed features, wherein the hash function F is dependent upon a characteristic of at least one of the plurality of features, the characteristic determinable from the plurality of features but indeterminable from a result of the hash function.

34. The device according to claim 33, wherein the processor stores data relating to the plurality of features within a storage medium and stores data relating to the hashed features within the storage medium.

35. The device according to claim 34, wherein the storage medium comprises a smartcard.

36. The device according to claim 34, wherein the storage medium comprises a secure authentication server.

37. The device according to claim 33, wherein the biometric sample comprises a fingerprint.

38. The device according to claim 33, wherein the processor stores the hashed features as public template data and stores data relating to the feature data as private template data in a secure storage medium, wherein the public data is for provision to an external processor for use in aligning a live biometric sample with the private template data.

39. The device according to claim 33, wherein the hash function is a function of a selected internal reference feature, the internal reference feature included in the plurality of biometric features.

40. The device according to claim 33, wherein the hash function is a function dependent upon a characteristic of each feature other than a location thereof.

41. The device according to claim 33, wherein the plurality of features include fingerprint minutia.

42. The device according to claim 41, wherein the hash function is a function of a location of the fingerprint minutia and at least one of an orientation and a type of the fingerprint minutia.

43. The device according to claim 33, wherein the hash function F is of the form:

$$F(Mi,r,t)=(Xi+r*\cos(Ai+t), Yi+r*\sin(Ai+t))$$

Where
r and t are random parameters;
Mi represent Minutia i;
(Xi, Yi) be the location of Minutia i; and
(Ai) be the direction of Minutia i.

44. The device according to claim 33, wherein the hash function F is of the form:

$$F(Mk, Mi)=(Xi+ri*\cos(Ai\ Yi+ri*\sin(Ai)\}$$

Where ri ÔjMk−Mil;
Mi represent Minutia i;
(Xi, Yi) be the location of Minutia i; and
(Ai) be the direction of Minutia i.

45. The device according to claim 33, wherein the hash function F is of the form:

$$F(Mk, Mi)=(Xi+ri*\cos(Ai-Ak), Yi+ri*\sin(Ai-Ak))$$

Where ri=JMk−Mij;
Mi represent Minutia i;
(Xi, Yi) be the location of Minutia i; and
(Ai) be the direction of Minutia i.

46. The device according to claim 33, wherein the hash function F is of the form:

$$F(Mk, Mi)=(Xi+Rx, Yi+Ry)$$

Where Rx is an, arbitrary function of Xi−Xk;
Ry is an arbitrary function of Yi−Yk;
Mi represent Minutia i; and,
(Xi, Yi) be the location of Minutia i.

47. The device according to claim 33, wherein the hash function F is of the form:

$$F(Mk, Mi)=(Xi+Rx, Yi+Ry, Ai+A)$$

Rx is an arbitrary function of Xi−Xk;
Ry is an arbitrary function of Yi−Yk;
A is an arbitrary function of Ai−Ak;
Mi represent Minutia i;
(Xi, Yi) be the location of Minutia i; and
(Ai) be the direction of Minutia i.

48. The device according to claim 33, wherein the hash function F is of the form:

$$F(Mi,r,D)=(Xi+r*\cos(Ai+D), Yi+r*\sin(Ai+D))$$

Where r and t are random parameters;
D is determined;
Mi represent Minutia i;
(Xi, Yi) be the location of Minutia i; and
(Ai) be the direction of Minutia i.

49. The device according to claim 33, farther comprising a smart card reader.

50. A method for hashing biometric data comprising:
transmitting from a first processor first data relating to a hashed subset of alignment features, the first data being hashed in accordance with reference data determinable from a biometric template data, the biometric template data relating to a set of features of a biometric image;
determining a hash function of a predetermined format from the hashed subset of alignment features;
transmitting from a second processor second data, the second data relating to live biometric features and the hash function; and comparing the first data and the second data.

51. The method of claim 50, further comprising aligning the first data and the second data.

52. The method according to claim 50, wherein the first storage medium and the first processor are disposed on a smart card.

53. The method according to claim 50, wherein the biometric image is a fingerprint image.

54. The method according to claim 50, wherein the live biometric data are provided by a biometric sensor in communication with the second processor.

* * * * *

UNITED STATES PATENT AND TRADEMARK OFFICE
CERTIFICATE OF CORRECTION

PATENT NO.         : 7,274,804 B2
APPLICATION NO. : 10/412348
DATED                 : September 25, 2007
INVENTOR(S)       : Laurence Hamid It is certified that error appears in the above-identified patent and that said Letters Patent is hereby corrected as shown below:

Column 2,
Line 42, delete "part" and insert -- party --.

Column 7,
Line 8, delete "substantial" and insert -- substantial --.
Line 36, delete "1116." and insert -- 116. --.

Column 8,
Line 67, delete "$M_{calc})_n$'" and insert -- $(M_{calc})'_n$ --.

Column 11,
Line 40, after "claims" insert -- . --.
Line 47, after "and" insert -- , --.

Column 12,
Line 35, delete "ri ô jMk-Mu;" and insert -- $ri = |Mk - Mi|$; --.

Line 42, delete "ri=JMk-Mij;" and insert -- $ri = |Mk - Mi|$; --.

Column 13,
Line 33, delete "Yi+R*sin(Ai+t))" and insert -- Yi+r*sin(Ai+t)) --.
Line 50, delete "ri=Imk-Mij;" and insert -- $ri = |Mk - Mi|$; --.

Column 14,
Line 52, delete "28," and insert -- 27, --.

Column 15,
Line 58, delete "ri ô jMk-Mil;" and insert -- $ri = |Mk - Mi|$; --.

UNITED STATES PATENT AND TRADEMARK OFFICE
CERTIFICATE OF CORRECTION

PATENT NO.       : 7,274,804 B2
APPLICATION NO.  : 10/412348
DATED            : September 25, 2007
INVENTOR(S)      : Laurence Hamid It is certified that error appears in the above-identified patent and that said Letters Patent is hereby corrected as shown below:

<u>Column 16,</u>
Line 5, delete "ri=JMk-Mij;" and insert -- $ri = |Mk - Mi|$; --.
Line 35, delete "farther" and insert -- further --.
Line 48, after "function; and" start a new paragraph with "comparing the first...".

Signed and Sealed this

Twenty-seventh Day of May, 2008

JON W. DUDAS
*Director of the United States Patent and Trademark Office*